United States Patent [19]
Shrekenhamer et al.

[11] Patent Number: 5,942,899
[45] Date of Patent: Aug. 24, 1999

[54] HYPERSPECTRAL RADIOMETRIC MINE DETECTOR BASED UPON SENSING MICROWAVE BRIGHTNESS TEMPERATURE AND INTERFERENCE CONTRAST SIGNATURES

[75] Inventors: Abraham Shrekenhamer, Los Angeles; Mostafa Karam, Diamond Bar, both of Calif.

[73] Assignee: Aerojet-General Corporation, Ohio

[21] Appl. No.: 08/900,147

[22] Filed: Jul. 28, 1997

[51] Int. Cl.[6] .............. G01V 3/08; G01V 3/165; G01R 23/00; G01R 19/00
[52] U.S. Cl. ........................... 324/326; 324/345
[58] Field of Search ................... 324/326–329, 324/331, 345

[56] References Cited

U.S. PATENT DOCUMENTS

| | | | |
|---|---|---|---|
| 4,766,385 | 8/1988 | Polvani | 324/345 |
| 4,825,165 | 4/1989 | Helms et al. | 324/345 |

*Primary Examiner*—Walter E. Snow
*Attorney, Agent, or Firm*—Leonard Tachner

[57] ABSTRACT

A passive mine detection apparatus useful for searching out buried mines, exploits natural soil emissions at microwave frequencies and unique interference-induced spectral reflection signatures from planar surfaces of buried mines interacting with the soil emissions. The apparatus comprises a focussed beam antenna, low noise amplifiers for respective polarizations, baseband converter, spectrum analyzer, A to D converter, signature recognition processor, display and/or alarm. Hand-held and vehicle-mounted implementations are disclosed.

20 Claims, 14 Drawing Sheets

MINE DETECTION SYSTEM BLOCK DIAGRAM

RADIOMETRIC INTERFERENCE FORMATION GEOMETRY

EMISSION SPECTRA FOR MINES AND CLEAR SOIL

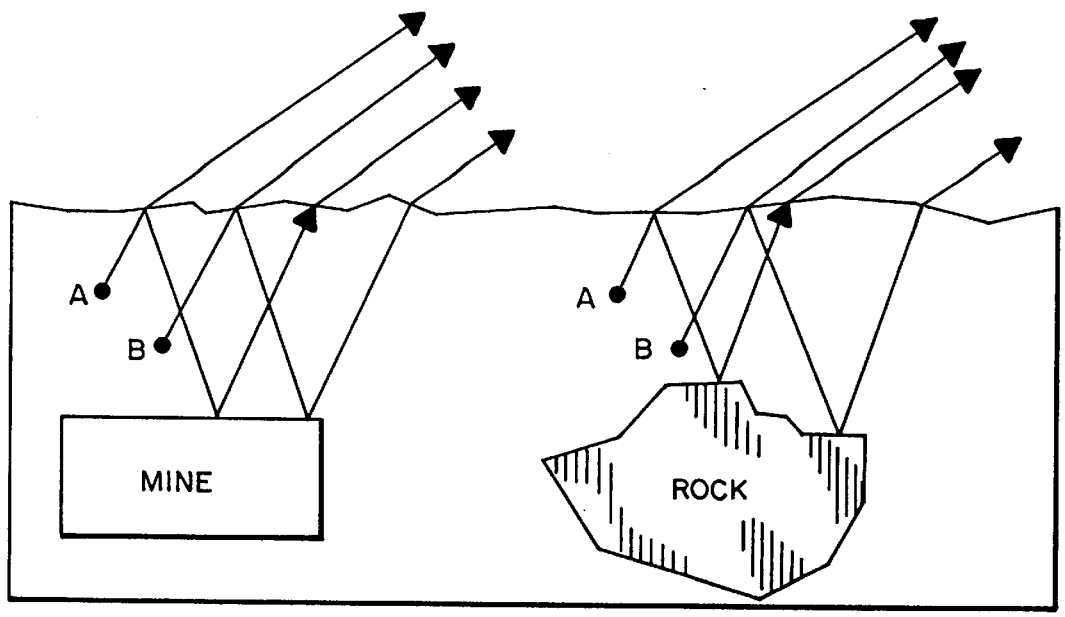
RADIOMETRIC INTERFERENCE SIGNATURE FREQUENCY
COHERENCE IS ENHANCED BY FLAT BOUNDARIES
FIG. 3
FIG. 4
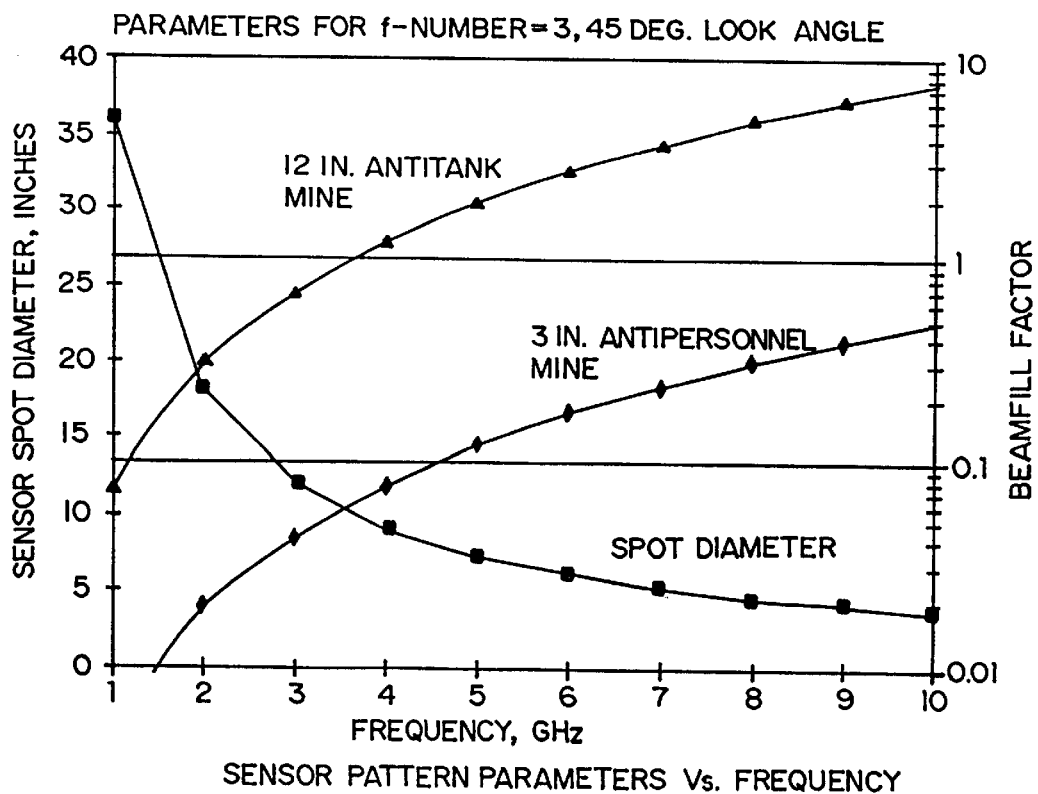
SENSOR PATTERN PARAMETERS Vs. FREQUENCY

FIG. 8  HANDHELD SENSOR CONFIRMATION GEOMETRY
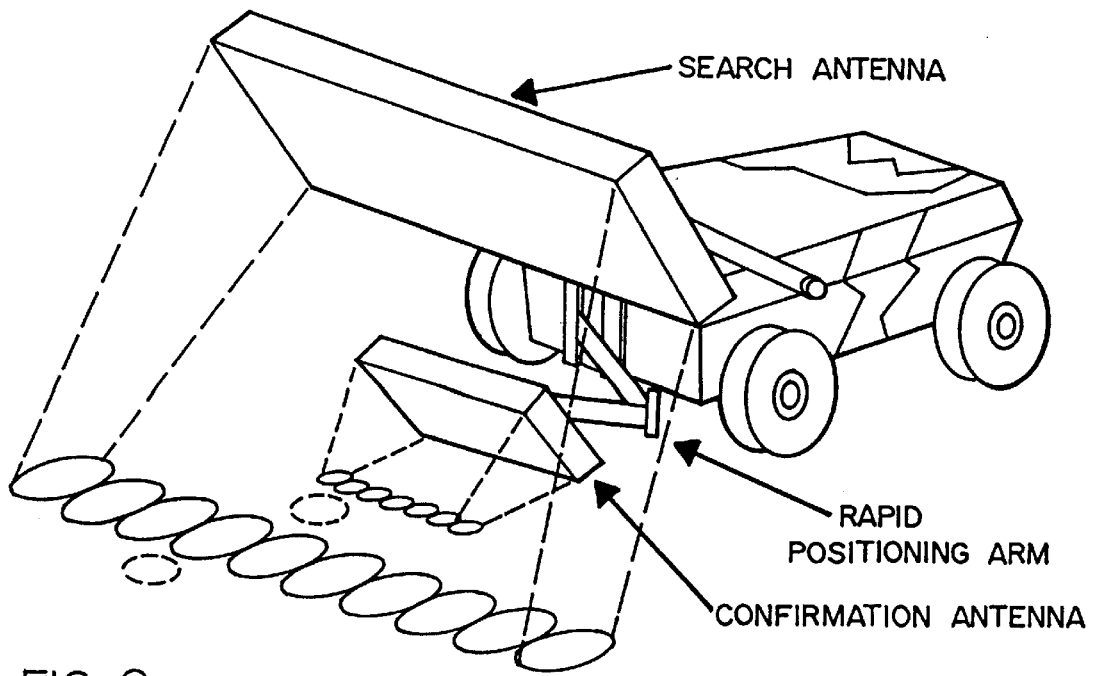
FIG. 9  VEHICULAR SENSOR CONFIGURATION

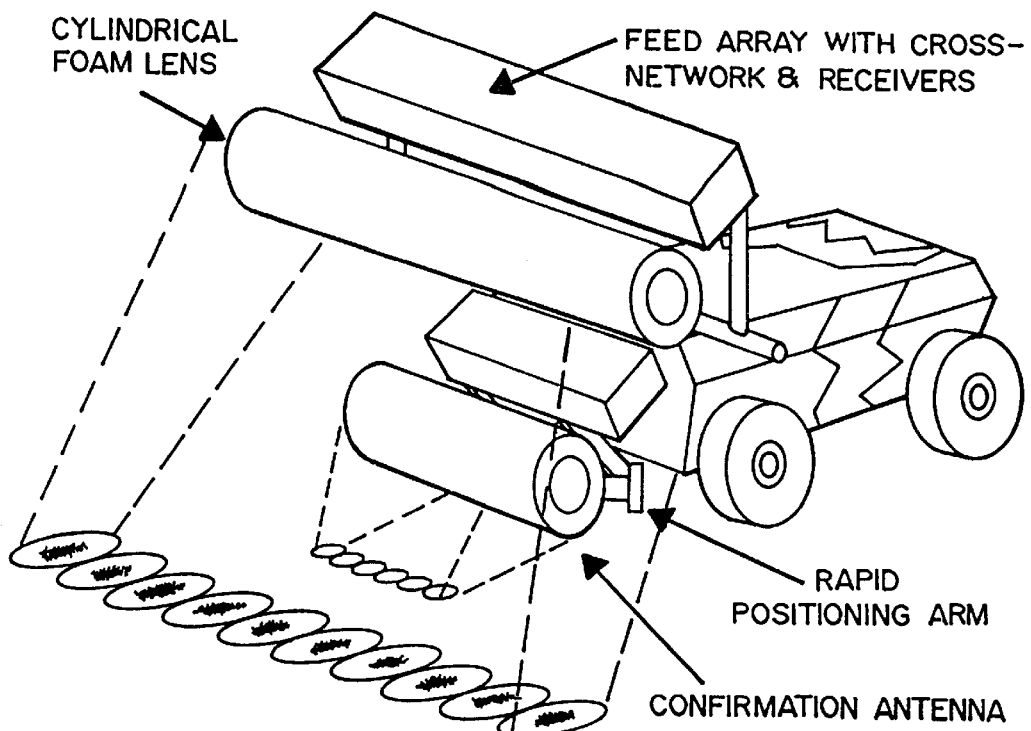
FIG. 10  CYLINDRICAL LENS VEHICULAR SENSOR CONCEPT
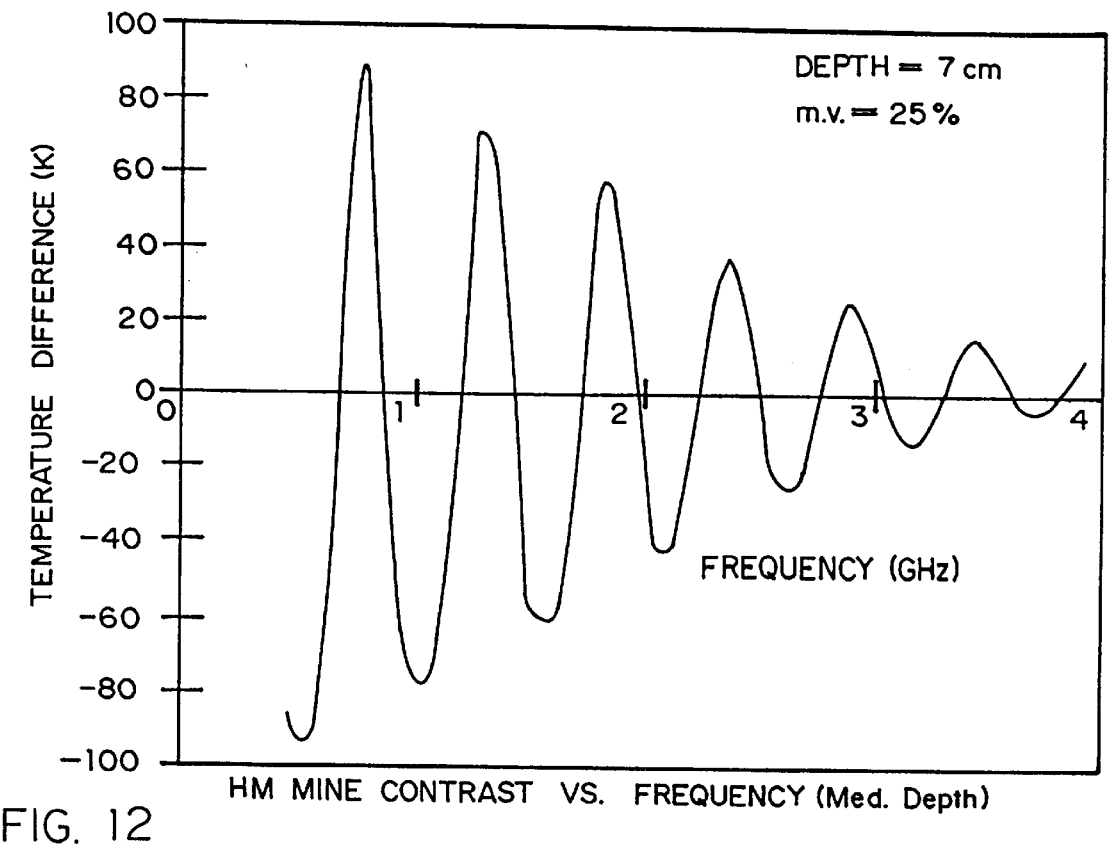
FIG. 12  HM MINE CONTRAST VS. FREQUENCY (Med. Depth)

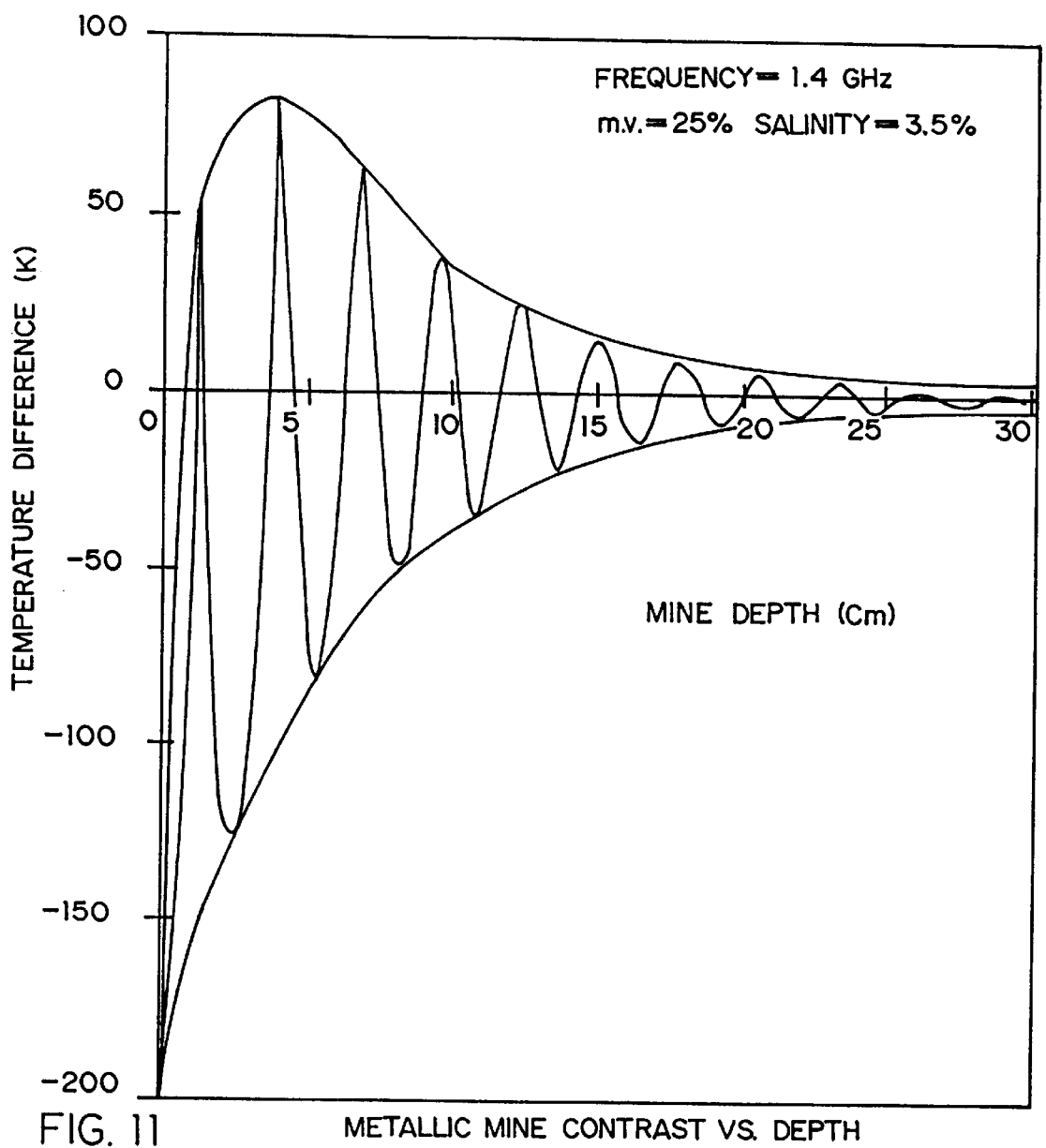
FIG. 11 METALLIC MINE CONTRAST VS. DEPTH
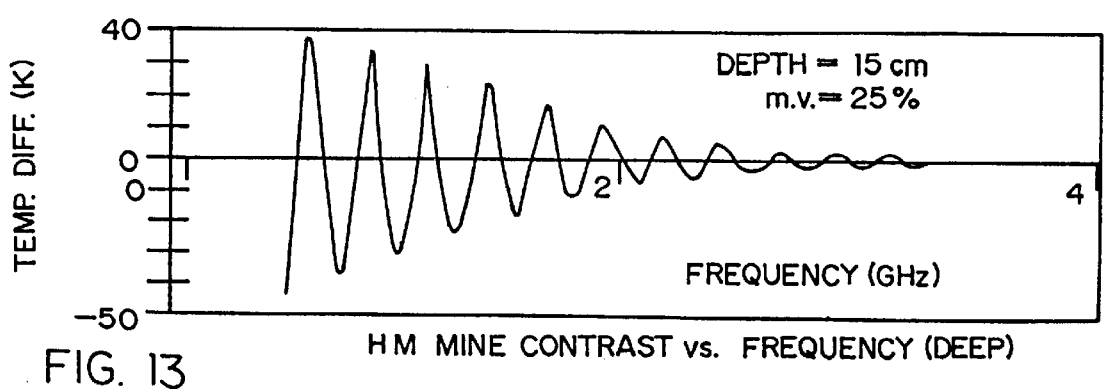
FIG. 13 HM MINE CONTRAST vs. FREQUENCY (DEEP)

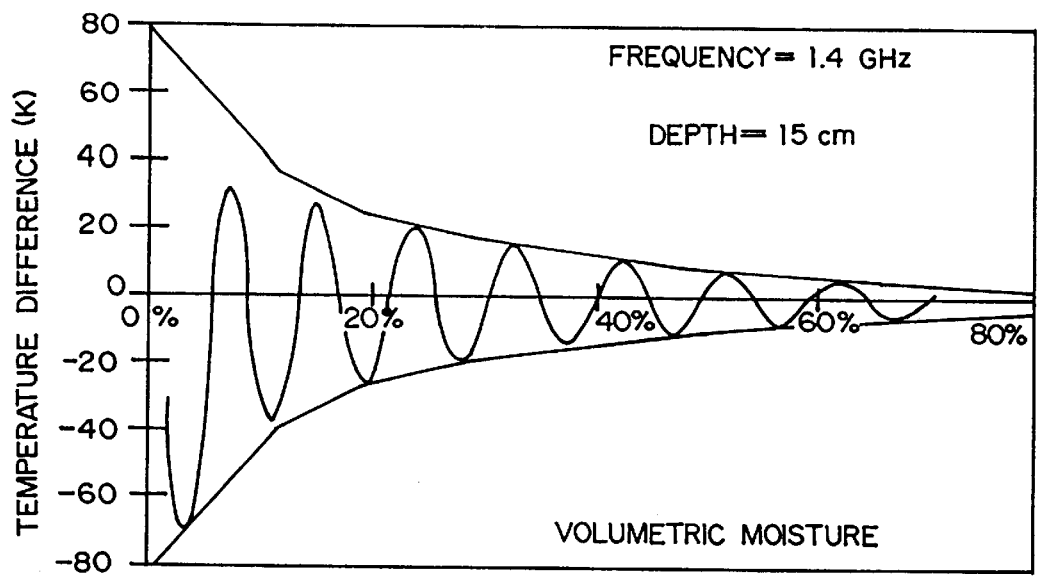
FIG. 14   METALLIC MINE CONTRAST VS. SOIL MOISTURE
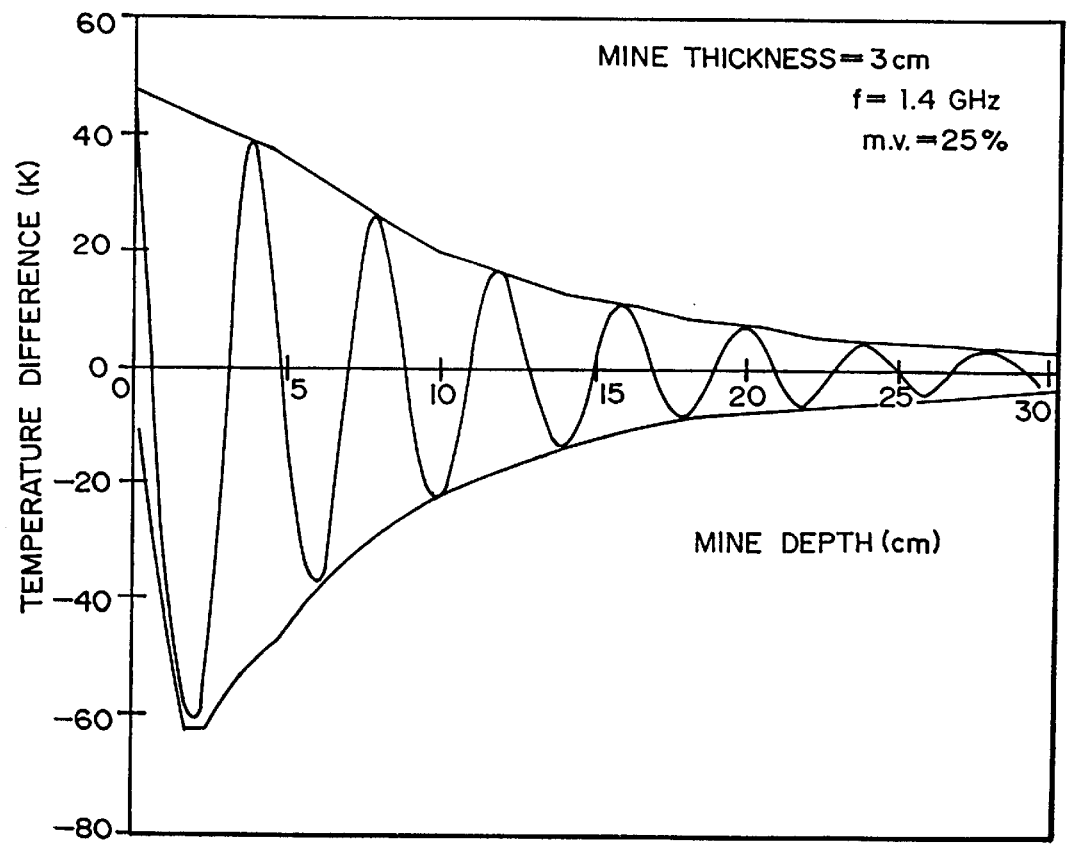
FIG. 15   PLASTIC MINE CONTRAST VS. DEPTH

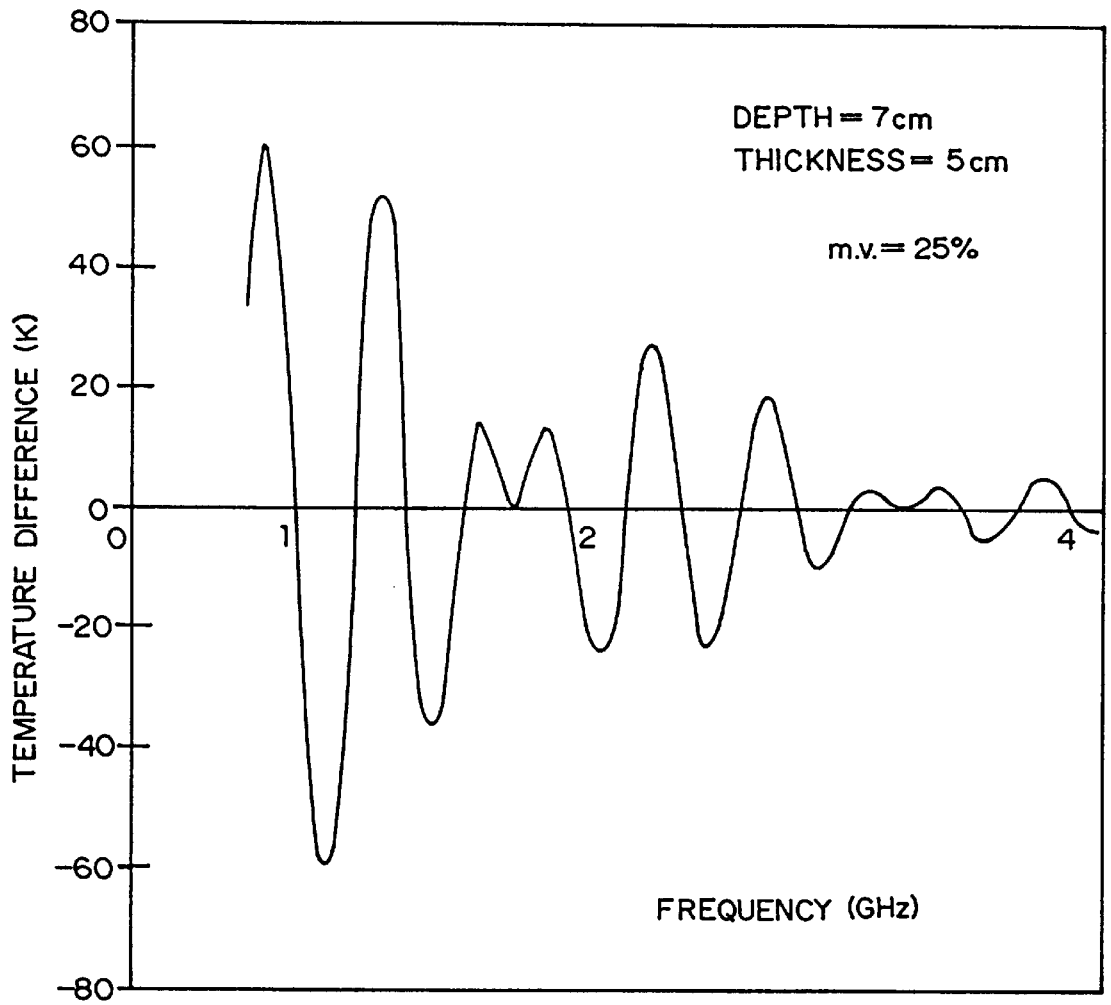
FIG. 16  NM MINE CONTRAST VS. FREQUENCY (MED. DEPTH)
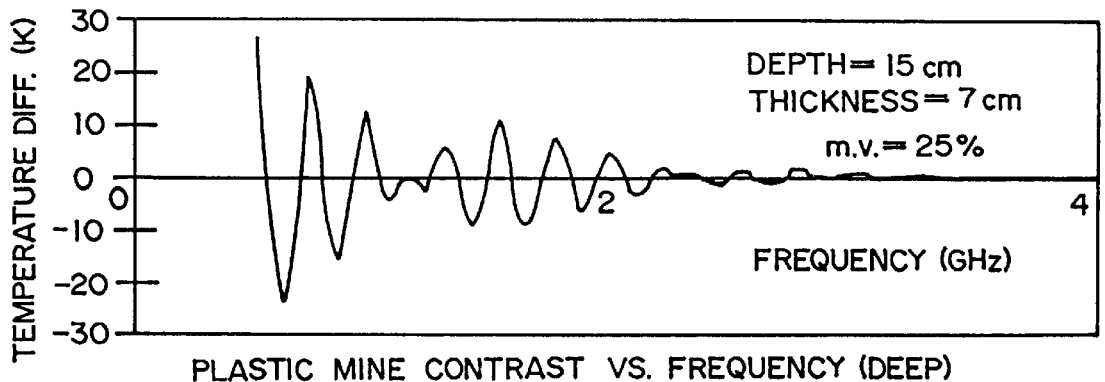
PLASTIC MINE CONTRAST VS. FREQUENCY (DEEP)
FIG. 17

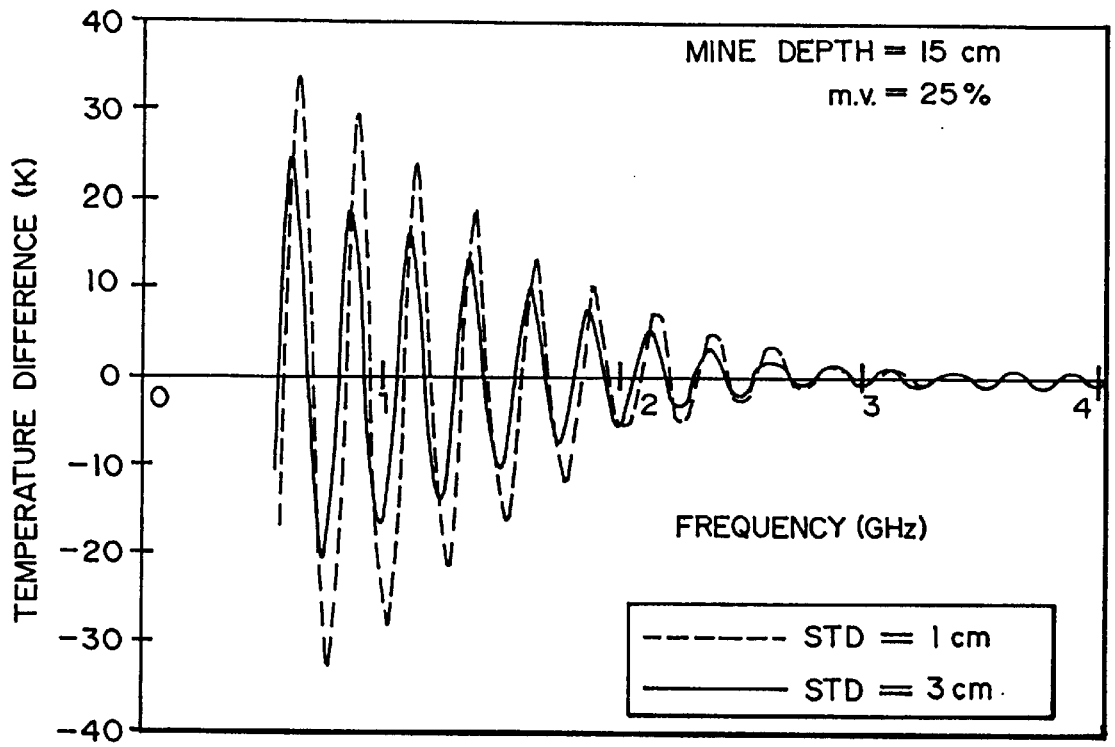
FIG. 22  EFFECTS OF SHALLOW ROCKS ON HM MINE CONTRAST
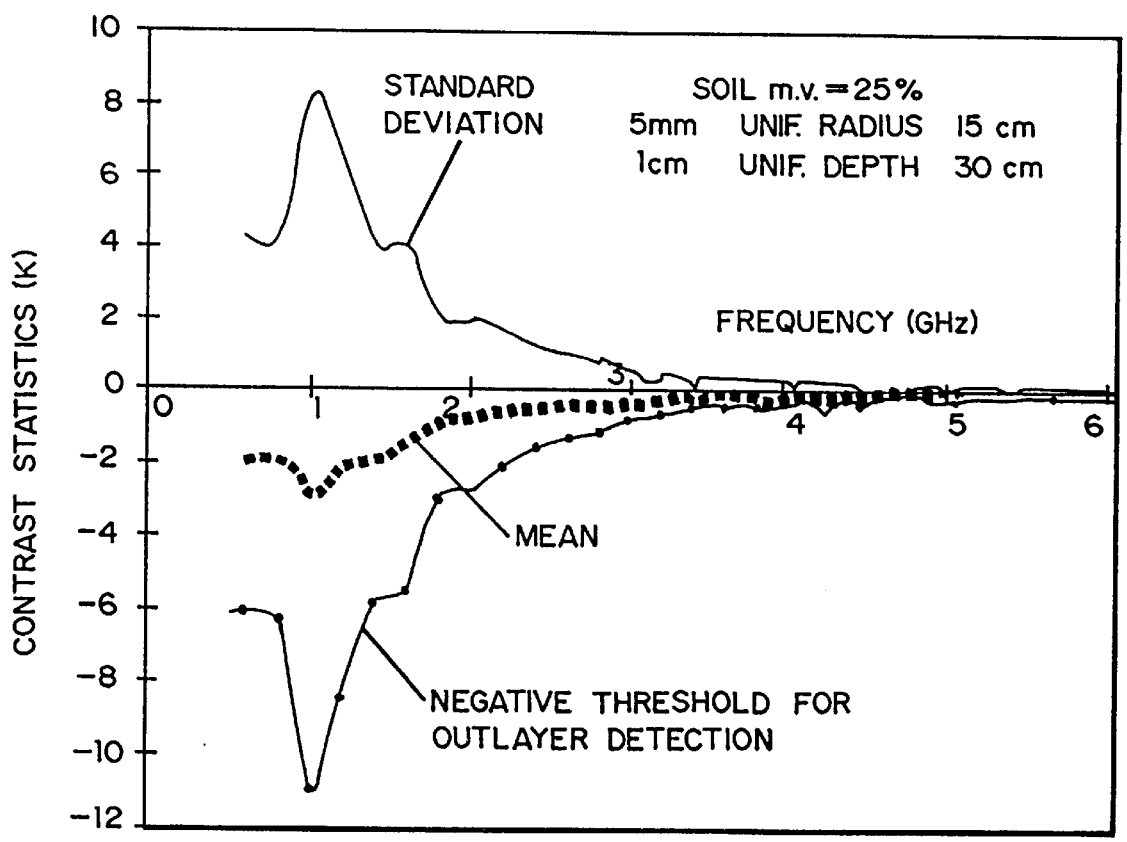
FIG. 23  CONTRAST STATISTICS FOR SPHERICAL ROCKS BURIED IN SOIL

HYPERSPECTRAL RADIOMETRIC MINE DETECTOR BASED UPON SENSING MICROWAVE BRIGHTNESS TEMPERATURE AND INTERFERENCE CONTRAST SIGNATURES

BACKGROUND OF THE INVENTION

1. Field of the Invention

The present invention relates generally to the field of mine detection apparatus which can detect metal and non-metal buried mines by recognizing passive microwave radiation signatures thereof.

2. Prior Art

The number of buried mines that continue to present a threat of severe injury and death well after their intended effective period of use, is staggering. There are over one-hundred million buried mines, many of which were specifically designed to be difficult to detect. New types are made of plastic or other non-metal materials which make their detection more problematic. Moreover, the use of buried mines during battle, from minor skirmishes to all out war, present a major threat to military and civilian personnel. Accordingly, there is an ongoing need for mine detection systems which are effective in locating metal and non-metal buried mines, which are sufficiently low cost and portable to be provided in large numbers, which are conducive to use by individual military personnel as well as on robotic and vehicular platforms and which can be operated without any requiring large power sources or exotic electronic devices.

The following list of U.S. patents were found but are not considered pertinent. The patents are now listed:

U.S. Pat. No. 3,028,596 McGillem et al
U.S. Pat. No. 3,129,330 Seling
U.S. Pat. No. 3,230,532 Whitney
U.S. Pat. No. 3,599,207 Foiani et al
U.S. Pat. No. 3,599,211 Mardon
U.S. Pat. No. 3,982,125 Roder
U.S. Pat. No. 4,115,776 Roeder et al
U.S. Pat. No. 4,521,861 Logan et al
U.S. Pat. No. 4,641,566 Pomeroy
U.S. Pat. No. 4,775,853 Perez Borruate
U.S. Pat. No. 4,872,014 Nowogrodzki
U.S. Pat. No. 5,012,099 Paturel et al
U.S. Pat. No. 5,121,124 Spivey et al
U.S. Pat. No. 5,160,934 Alpers et al
U.S. Pat. No. 5,214,281 Rowe
U.S. Pat. No. 5,218,345 Muller et al
U.S. Pat. No. 5,227,800 Huguenin et al
U.S. Pat. No. 5,266,799 Steinitz et al
U.S. Pat. No. 5,286,973 Westrom et al
U.S. Pat. No. 5,311,273 Tank et al
U.S. Pat. No. 5,324,948 Dudar et al
U.S. Pat. No. 5,354,987 MacPherson
U.S. Pat. No. 5,365,237 Johnson et al
U.S. Pat. No. 5,371,358 Chang et al
U.S. Pat. No. 5,381,422 Brown et al
U.S. Pat. No. 5,412,206 Seidel et al
U.S. Pat. No. 5,438,336 Lee et al
U.S. Pat. No. 5,445,453 Prelat
U.S. Pat. No. 5,461,229 Sauter et al
U.S. Pat. No. 5,471,056 Prelat
U.S. Pat. No. 5,483,339 Van Aken et al
U.S. Pat. No. 5,495,106 Mastny
U.S. Pat. No. 5,506,406 Kapp et al
U.S. Pat. No. 5,548,115 Ballard et al
U.S. Pat. No. 5,559,332 Meissner et al
U.S. Pat. No. 5,561,294 Iddan
U.S. Pat. No. 5,585,628 Andrews et al
U.S. Pat. No. 5,585,632 Hull et al
U.S. Pat. No. 5,587,583 Chin et al
U.S. Pat. No. 5,600,139 Mladjan et al U.S. Pat. No. 5,227,800 to Huguenin et al is directed to a millimeter wave detection system that provides an image to a video display of contraband including plastic and ceramic concealed weapons. The system can be passive as shown in the radiometric embodiment, FIG. 6, or can use amplitude modulated source arrays of linearly polarized radiation to illuminate the field of view. A pair of arrays 162, 164 of gun diodes emit quasi-coherent radiation which is linearly polarized for improved detection. A camera 166 having antenna detector array 36 made of elements 66, each a balanced antenna with diode provides a signal representing the image of the field of view. One of the several embodiments has provisions for varying the polarization so as to enhance the detection of both metallic and non-metallic targets.

U.S. Pat. No. 4,641,566 to Pomeroy is directed to a method for detecting plastic mines that have been buried for a long time, so that the temperature differences vanish and thermal detectors no longer function effectively. A solution 22 of a detachable material is sprayed uniformly over a surface are by helicopter or airplane. The solution percolates downward through the earth and coats the upper surface 26 of mine 10. The recognizable shape 40 of the mine can be detected by detector 52 and displayed on screen 62.

U.S. Pat. Nos. 5,445,453 and 5,471,056 both to Prelat are directed to a method of airborne surveying that includes determining the thermal inertia of the earth's surface, particularly useful in exploration for natural resources, environmental assessment, as well as ground target identification. A sensor processing unit 12 containing spectrometer assemblies 14, 16, 18 each configured to receive a radiometric band of frequencies are mounted on an airborne platform. A central processor 24 converts image data into radiometric units to perform atmospheric correction and geometric rectification to enhance the received data. Post flight processing of a first airborne mission under conditions of lowest solar heating and a second airborne mission of maximum solar heating can determine the thermal inertia of the ground.

U.S. Pat. No. 5,371,358 to Chang et al is directed to an imaging spectrometer adapted to low altitude, low speed, airborne applications for geophysical, geological, and environmental surveys. Radiant energy at various wavelengths is reflected from terrain 10 and is received by an imaging system located in aircraft 12. The imaging system has a plurality of spectrometers 24, 26, 28, 30, the spectrometer being equipped with a bandpass filter and a plurality of detecting elements, provides up to 128 corresponding channels with a variable bandwidth optimized to provide the highest practical signal-to-noise ratio for each desired wavelength. The system is under the control of a system controller and data acquisition unit 120 and interfaces with the spectrometers and detectors, scanners, gyroscope 132, data recorder, storage unit, onboard monitoring display, hard copy recorder, and ground data processing computer.

U.S. Pat. No. 5,365,237 to Johnson et al is directed to a camera system that is capable of imaging objects through media such as wood, or fog, providing a greater field of view and a simpler system. The camera system modulates an optical beam with the signal received from the antenna to impose the spectral components that are a function of the received frequencies of the microwave radiation. The signal received from antenna 6 is used to modulate an optical beam from laser 12. The modulated beam is processed through the rest of the system including the etalon 35 and finally supplied to a video camera 8. The one-dimensional image could be converted to a two-dimensional image by panning the camera system, mounting the camera on a moving platform, or providing an array of antennas and a corresponding number of optical modulators. The image from the video camera can be supplied to video monitor 58.

SUMMARY OF THE INVENTION

A new approach to land mine detection utilizes a broadband passive microwave spectrometer with a close-focused antenna sensing the earth's natural thermal radiance. This radiance originates from within and propagates up through the soil to radiate from the surface and is thus affected by surface and buried objects.

Analyses show the detection of plastic and metal mines can be achieved by exploiting naturally occurring radiometric interference signatures (RIS) using a carefully designed microwave spectrometer and signal processing algorithms. This unique signature results from the interference of soil electromagnetic emissions with their reflections from the mine. Radiometric analysis indicates excellent soil depth penetration and very large signal-to-noise margins for realistic field conditions using frequencies in the 0.4 GHz to 10 GHz regime. Data from a controlled test using a 1–2.5 GHz radiometer supports the theoretical analysis. The low power required for a passive radiometer makes possible both manpack and vehicle mounted systems.

The following acronyms and abbreviations are used herein:

AP Anti-personnel
ELINT Electronic Intelligence
EMI Electromagnetic Interference
FAR False-Alarm Rate
GPR Ground Penetrating Radar
HM High Metal
IC Induction Coil
IIR Imaging Infrared
LM Low Metal
LNA Low-Noise Amplifier
NM Non-metal
$P_d$ Probability of Detection
$P_{FA}$ Probability of False Alarm
RFBW Radiometer Frequency BandWidth
RFI Radio Frequency Interference
RIS Radiometric Interference Signature
SCR Signal-to-Clutter Ratio
SNR Signal-to-Noise Ratio The system architecture is configurable into hand-held and vehicle-mounted systems. Preliminary analyses, indicate that performance objectives of high Probability of Detection (Pd), Low False Alarm Rate (FAR), standoff range, area search rates, and location accuracy are within reach using this technology, thus outranking all systems in the field and in development.

The inventive approach is fundamentally different from other detection schemes. It does not rely on the metallic content of the mine; it utilizes the fundamental differences between mines of all types and rocks the surrounding soil. The difference in microwave impedance, enhanced by cavity effects formed by mine-soil geometry and inherently robust by wide-spectrum sensing of noncoherent radiance, thus differentiates between buried man-made objects (flat, regular shapes) and natural, irregularly shaped ones. The overall benefits of this technology are shown in Table I.

TABLE I

SUMMARY OF INVENTIVE FEATURES AND BENEFITS

| FEATURES | BENEFITS |
| --- | --- |
| SPECTRAL RADIOMETER SENSOR (GENERAL) | ROBUST DETECTION OF BURIED AND EXPOSED HM, LM AND NM MINES; IMPROVED Pd AND FAR ACCURACY AT RANGE AND AREA COVERAGE RATE |
| TOTAL POWER CALIBRATED SENSING | MEASURES SOIL MOISTURE AND ADJUSTS ALGORITHM ADAPTIVELY. SIGNALS OPERATOR OF PERFORMANCE DEGRADATION. |
| ANGLED STANDOFF FOCUSED PATTERN PROJECTION | SLOWDOWN AND STOPPING DISTANCE (VEHICLE MOUNTED). REDUCED WAND LENGTH FOR FASTER SCAN (MANPACK). ENABLES POLARIZATION DISCRIMINATION. ELIMINATES INTERACTION OF SELF-NOISEGROUND REFLECTIONS WITH SENSOR. |
| PASSIVE SENSING | REDUCED POWER, SMALLER SIZE, WEIGHT, COST; HIGHER RELIABILITY ABSENCE OF GLINT KEY FOR LOCATING ACCURACY DOES NOT INTERFERE WITH OTHER EQUIPMENT. COVERT. |
| LOW NOISE FRONT END | ENABLES HIGH Pd AT TACTICAL SPEEDS. ROBUST, SIMPLE SELF-CALIBRATION. |
| BROADBAND HYPERSPECTRAL COVERAGE | EXTENSIVE SIGNATURE CHARACTERIZATION: NEW DIMENSIONS IN MINE CLASSIFICATION AND CLUTTER DISCRIMINATION. OPERATION IN PRESENCE OF INTENSE EMI. |
| DUAL POLARIZED | DETECTS DISTINCT SIGNATURES OF SHALLOW AND EXPOSED PLASTIC MINES. LOW-COST CROSS-CALIBRATION; |

TABLE I-continued

SUMMARY OF INVENTIVE FEATURES AND BENEFITS

| FEATURES | BENEFITS |
| --- | --- |
| LOWER MICROWAVE FREQUENCIES | MATURE LOW-COST, HIGH-PERFORMANCE COMPONENTS. POTENTIAL FOR SHARED RECEIVER AND ANTENNA WITH GPR. |
| ADJUSTABLE FOCUS | SAME SENSOR TECHNOLOGY FOR FAST SEARCH (ALERT) AND RELIABLE DETECTION (CONFIRM) MODES. |
| GRADIENT FOAM ANTENNAS | INCREASED EFFECTIVE APERTURE, BROADBAND, SUPERIOR POLARIZATION PURITY. |

OBJECTS OF THE INVENTION

It is therefore a principal object of the present invention to provide an effective mine detector which utilizes passive sensing of radiometric interference signatures.

It is another object of the invention to provide effective mine detection by recognition of unique radiometric signatures from interference of soil electromagnetic emissions with their reflections from a buried mine.

It is still another object of the invention to provide a mine detector which utilizes extremely low power for passive detection and recognition of inherent interference signatures from buried mines.

It is still another object of the invention to provide a unique new method of detecting buried mines, the inventive method being conducive for implementation in manpack and vehicle mounted configurations.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3 is an illustration showing the basis for differences in radiometric interference signature between flat surface buried mines and irregular surface buried rocks;

FIG. 4 is a graphical illustration of key sensor relationships with frequency of detection;

FIG. 8 is a conceptual diagram of the geometry of mine detection configuration using the invention as a hand-held detector;

FIG. 9 is a conceptual illustration of a vehicle configuration of the sensor of the invention;

FIG. 10 is a conceptual illustration of a vehicle/cylindrical lens configuration of the sensor of the invention; and FIGS. 11 through 25 provide graphs of various mine-related signature parameters used to explain the disclosed embodiments of the invention.

DETAILED DESCRIPTION OF PREFERRED EMBODIMENTS

Figure 1:
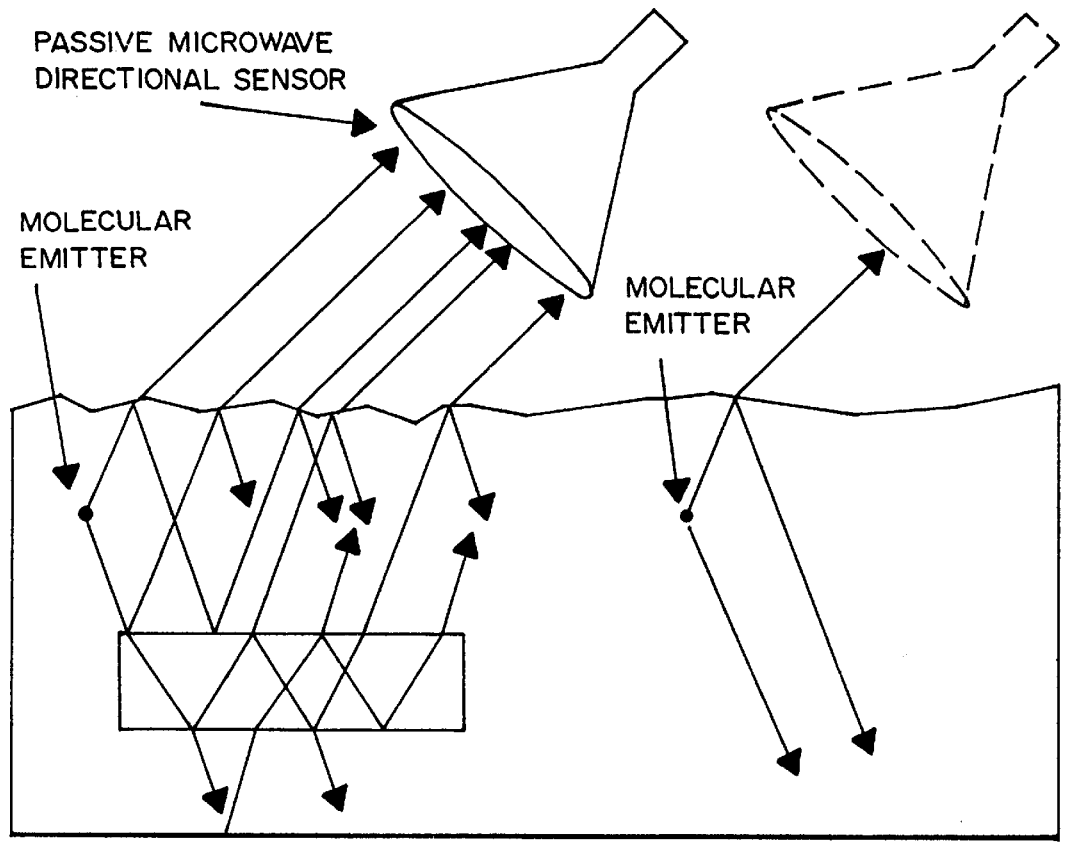
FIG. 1 is a simplified illustration of the geometry of radiometric interference formation.

The basic phenomenology of the invention is shown in FIG. 1. Coherent interference of natural radiance is caused by reflections from air-soil and soil-mine interfaces. The natural radiance "emitters" shown are two of many soil molecules producing omnidirectional broadband electromagnetic radiation by virtue of their thermal vibrations while absorbing radiance from other sources. The ensemble of randomly-vibrating molecules creates total radiance received at a sensor above the soil which is non-coherent and equals the scalar sum of the molecular power fractions radiated to the sensor after incurring in-path attenuation and reflections.

Considering only energy which ultimately arrives at the sensor, a typical single upwelling ray originates in a soil molecule above a mine. At the surface, a fraction of this energy will be refracted towards the sensor and the remainder will reflect downward towards the mine. At the mine the ray will reflect upwards either in full (for HM) or in part (for LM and NM). This reflected energy will propagate upward, continually losing power in soil until reaching the surface where fractions of it will again refract towards the sensor.

In LM/NM mines, incident rays refracted into the mine will undergo multiple internal reflections. Portions of these internally reflected rays will be refracted through the top mine-soil interface towards the sensor.

The two or more partial rays emitted toward the sensor are mutually coherent (by originating from the same ray). The differential path length between the first two rays is the round-trip travel distance from the surface to the mine. The corresponding propagation delay will depend on the depth, ray, angle, and the soil's propagation constant. Rays formed through internal reflections within a LM/NM mine will have propagation delays proportional to the mine's thickness, its propagation constant, and ray angle (defined by the sensor's look, angle and refraction).

Figure 2:
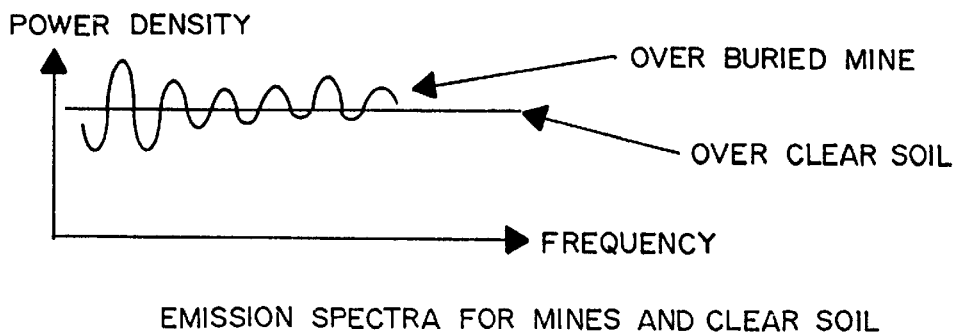
FIG. 2 is a simplified illustration of emission spectra for mines and clear soil.

These differential path rays cause a harmonic spectral interference at the sensor. At some frequencies these two rays interfere constructively to increase (by square law) total radiated power, and at interleaved frequencies the rays interfere destructively to decrease it. This interference requires step changes in soil wave properties, but is absent in homogeneous and gradually changing soils, which have spectrally flat emissions. Therefore, spectral energy characteristics are distinctly different for two simple cases considered so far, the buried mine and clear soil (FIG. 2).

The downwelling portions of molecular emissions (FIG. 1) form spectral interference patterns similar to the upwelling ones. These rays reflect off the mine first, travel up to the surface, and then partially reflect down to undergo the same processes as initially upwelling rays.

Details of the spectral signature that is formed depend on mine characteristics HM/LM/NM, geometry, orientation, depth, soil characteristics, view angle, and polarization. Surface-laid HM mines, while not producing the RIS signals described above, have a very low radiance level compared to soil due to the metal's low emissivity compared with the soil's. Surface-laid LM and NM mines will form interference signatures through internal reflections of upwelling soil radiance (through soil-mine and mine-air-interfaces), resulting in a single spectral modulation harmonic. Buried HM mines will also have a single spectral modulation harmonic, while buried LM and NM mines will have three modulation harmonics which appear due to the interference effects of the mine's upper and lower surfaces with the soil-air boundary.

The mine's RIS is reinforced when its geometry is flat and relatively parallel to the soil-air interface (FIG. 3). In this manner, all soil molecular sources propagate their radiance through similar differential path pairs, causing their spectral emissions to vary in concert. Consequently, the signal received from a mine is expected to be stronger than that from a similarly sized rock, where facets at different depths will cause varying spectral interference sequences, resulting in spectral "smearing" and contrast reduction.

The inventive detector is a directional patterned spectrum analyzer sensor coupled to a discrimination processor. Although thermally emitted microwave power levels from the soil are very low (approximately 3–4 picowatts/GHz @300° K soil temperature) and require the use of highly sensitive receivers, tests have confirmed that RIS is readily detectable with today's state-of-the-art radiometric sensing and signal processing technologies.

The key driver affecting the sensor design is the area ratio between the sensor footprint on the ground and the mine to be detected, known as a Beamfill Factor, which partly determines the strength of the received signature. These considerations impact the practical design in terms of the operating wavelength, sensor pattern forward projection distance requirements, antenna aperture size and mine class and size to be detected. Generally, to increase soil penetration will require lower microwave frequencies, while minimizing sensor pattern width for a given aperture size and projection distance will favor higher frequencies.

The desired operating frequency band is bracketed by the following considerations:

The longest usable wavelength must be on the order of the size of the mine to be detected—with longer wavelengths, interference cannot develop.

The shortest usable wavelength must be such that the antenna beam is broad enough to intercept both the original rays and their reflections at the viewing angle for interference to develop.

It is convenient to define the key sensor dimensional parameter as a ratio of pattern projection range to aperture diameter, or simply the f-number (as in optical systems). The rule of thumb is that in a diffraction-limited sensor the sensing spot diameter can be approximated by the wavelength times the f-number. FIG. 4 shows key sensor relationships using notional apertures of 48 inches for vehicular and 16 inches for hand-held applications and their projection pattern distances of 12 feet and 4 feet, respectively. These values represent an f-number of 3:1 for both configurations.

Significantly, FIG. 4 shows that antitank (AT) mines can achieve a high beamfill factor at low frequencies which penetrate deeper. Antipersonnel (AP) mines need higher frequencies for good beamfill, but they are generally located at shallow depths where the higher frequencies can reach.

To achieve higher sensitivity, the sensor can form a smaller beam and higher beamfill factor with an adjustable focus to operate at closer distances. This suggests an effective same-phenomenology dual-mode operation with a wide sensor spot for fast mine search and alert, and a highly focused spot for confirmation. In addition, confirmation interrogation sensor dwell times can be significantly increased to reduce noise and display a "cleaner" spectral sweep data to the operator.

The use of close-focused radiometric sensing is expected to readily meet mine location accuracy requirements. The absence of radar glint effects and expected high signal-to-noise ratios mean that peak-response search and beam-bisecting techniques can reliably indicate mine centroid locations.

Potential Causes of False Alarms and Solutions Have Been Considered

1. Temporal noise is routinely handled by allowing sufficient sensor dwell time to integrate the signal using low-noise front-end components and designing the sensor antenna to provide sufficient mine beamfill.

Preliminary analyses indicate that temporal noise will not contribute significantly to FAR as SNRs of 50:1 are feasible. These calculations assume available receiver components, beam dwell times available at desired coverage rates, and beamfill ratios typical of practical f-number=3 systems and notional processing.

2. Objects in ground other than mines may be rocks of various sizes and densities. Because of the irregular shapes of rocks, the reflections from different rock portions will mutually "smear" each other's spectral modulation waveforms, resulting in a 5 dB or lower signature contrast (for a spherical rock) than similarly-sized plastic mines. Additional discrimination is expected from simple feature recognition as described below.

3. Surface radiance variations will be produced by patches of moisture, puddles, uneven vegetation cover, and surface texture including gravel or shallow rocks. These will not produce spectral signals like buried mines, but could be confused with surface-laid metal mines. Preventing these false alarms may require closer-range confirmation sensing at a higher beamfill, polarization discrimination, and simple feature recognition such as size and shape.

Real-time sensing of soil moisture will drive algorithm decision logic for optimum performance, warn the operator of degraded conditions, and even predict when improved conditions will occur.

4. Reflections of the sensor's own noise can produce mine-like spectral modulation. This can be reduced with a focused forward-projected beam to reflect most sensor noise away, use of low-noise amplifiers (LNAs) and low-loss antennas, and frequency spectrum sampling with sufficient resolution to separate the reflection-induced modulation frequencies from mine signatures.

5. Electromagnetic Interference (EMI) will be handled by the sensor's built-in frequency-analyzer function. Sampled spectral data will be monitored for EMI, and where detected, the affected spectral segment will be blanked-out and interpolated with data from adjacent valid spectral cells.

Frequency, Bandwidth, Polarization and Algorithms

SCR enhancement involves a hierarchy of techniques. In the sensor itself, narrowing the beamwidth, optimizing the center frequency, widening the bandwidth, and polarization all contribute, and may suffice, in many mine/clutter encounters. However, the highly-predictable form of mine and worst-case clutter signatures permits the use of simple but powerful feature recognition algorithms.

Figure 5:
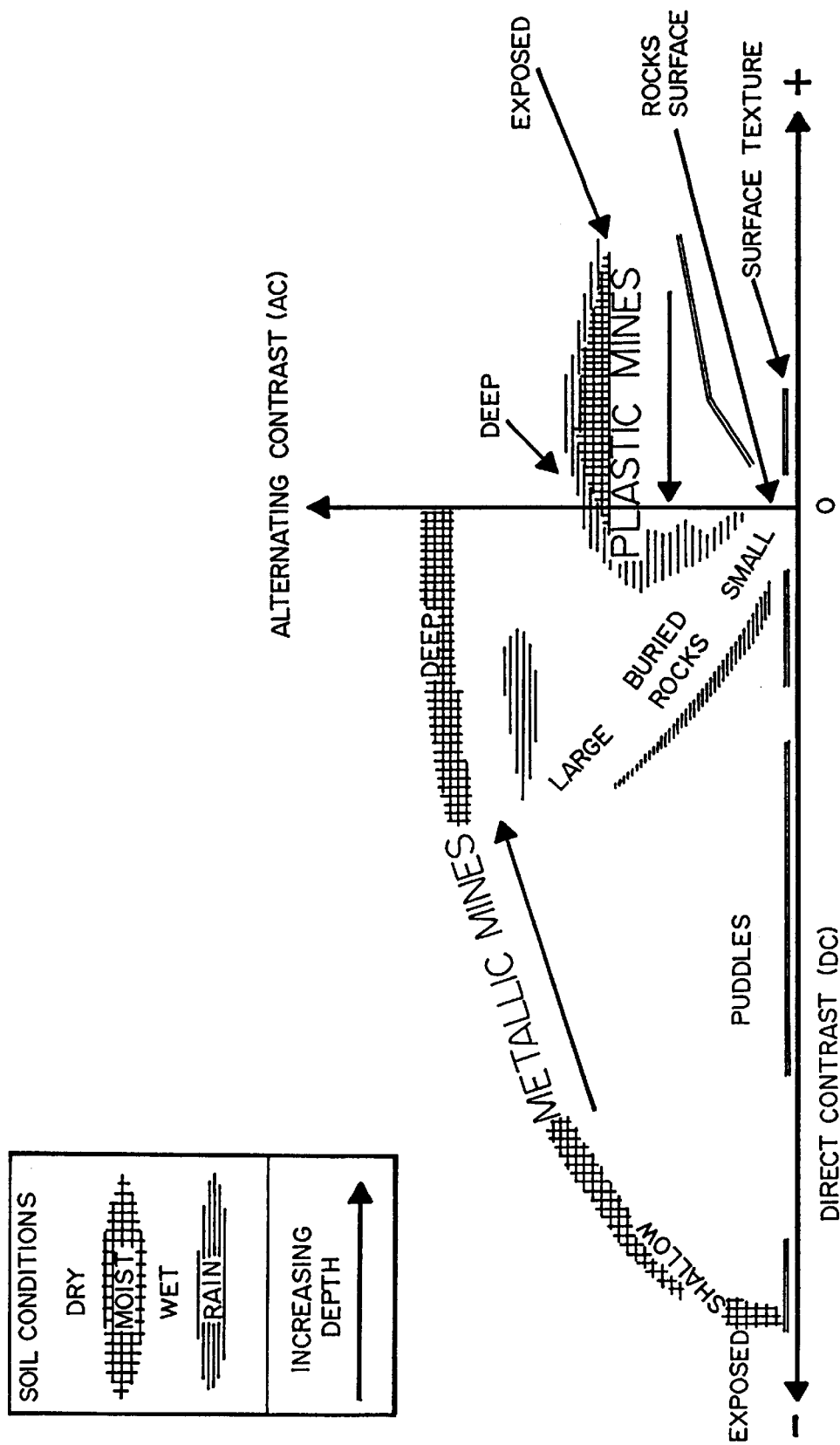
FIG. 5 is a graphical illustration of brightness plane signature zones under different soil moisture conditions.

The mine signatures and clutter have an AC and a DC component. FIG. 5 shows these mapped zones on a "brightness plane". Note that in many cases the AC and DC coordinates alone permit clutter rejection. In regions of possible overlap, features in other dimensions of "brightness space"—object size/shape, H vs. V polarization (including Brewster angle effects), signature spectrum analysis, and different viewing angles—will certainly enhance clutter rejection and thereby lower FAR. In many cases it may be possible to recognize the size, type and depth of a mine.

The highest level of clutter rejection to be investigated uses adaptive thresholding, alert and confirm modes, and aural and visual displays to enlist the recognition capabilities of the human brain.

Processing algorithms may be optimized using the experimental and modeled signature database to cover the full range of anticipated operational conditions.

Detector Architecture for Tactical Systems Implementations

Figure 6:
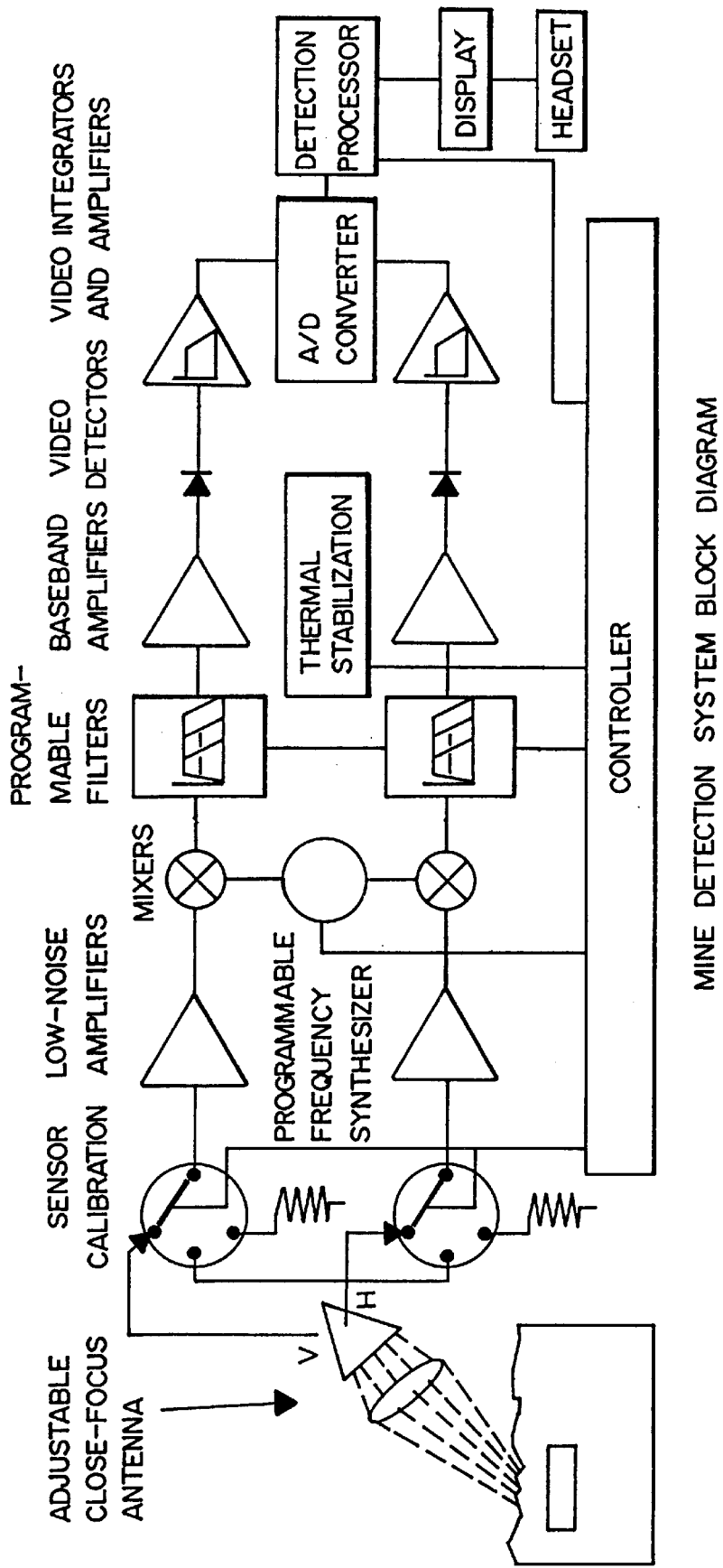
FIG. 6 is a block diagram of a preferred embodiment of the mine detection system of the invention.

An overall detector system architecture is shown in FIG. 6. FIGS. 7–10 illustrate the operating scheme, and tactical implementation concepts for both hand-held and tactical variants. The baseline sensor concept employs a close-focused broadband dual-polarized microwave antenna and a dual-channel receiver for horizontal and vertical polarization processing.

LNAs will precede down-conversion mixers to assure high sensitivity. A calibration switching arrangement will alternate antenna inputs to the amplifiers with ambient load and to input of the other amplifier, which, by virtue of its low noise and good match, represents a "cold load source" for continuous self calibration.

The programmable down-conversion and selectable baseband filter width scheme is designed to sample the spectrum in adaptive manner to avoid EMI artifacts. The remainder of the signal processing chain is typical of microwave radiometry with time constants matched to the speeds required to achieve an acceptable ground coverage rate.

The antennas are of special interest in this application and need to have broadband, dual-polarized, and project high-resolution, adjustable close-focused sensing patterns to perform under tactical size and weight constraints. Gradient-dielectric lens antennas seem to have the best potential to satisfy all these requirements simultaneously. These antennas, which include spherical, cylindrical and planar Luneberg Lenses, have excellent broadband and polarization characteristics.

Lens antennas have added value in this application, where beamfill factor is governed by the available aperture extent. When the physical aperture spans a few wavelengths, the effective electrical aperture of lens antennas can be increased some 30% over the physical aperture. By designing the feed pattern for over-illumination, it will form a fringing field around the lens that contributes to sensing beam focusing constructively.

Hand-Held Mine Detector

Figure 7:
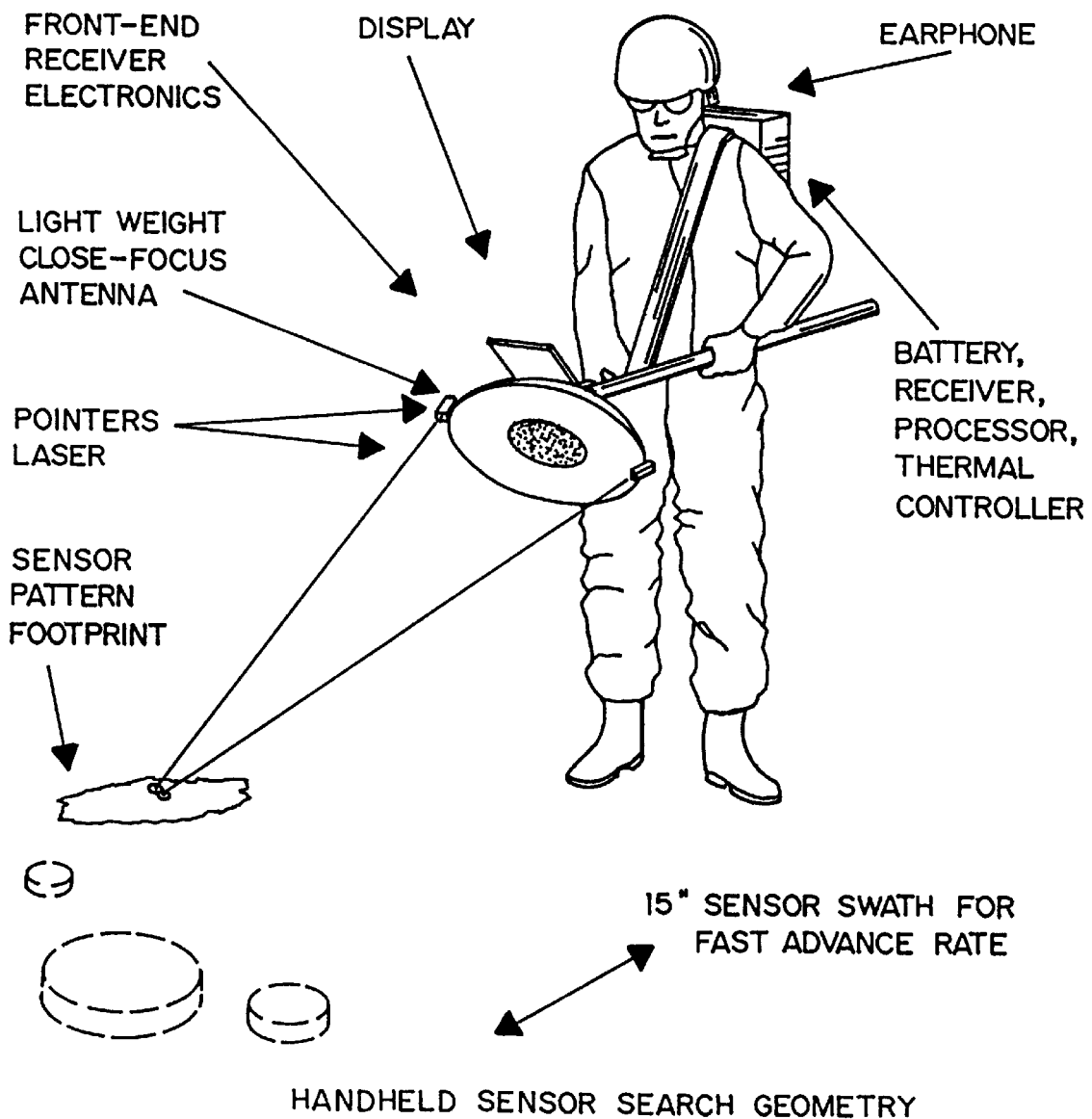
FIG. 7 is a conceptual diagram of the geometry of a search using the invention as a hand-held detector.
Figure 18:
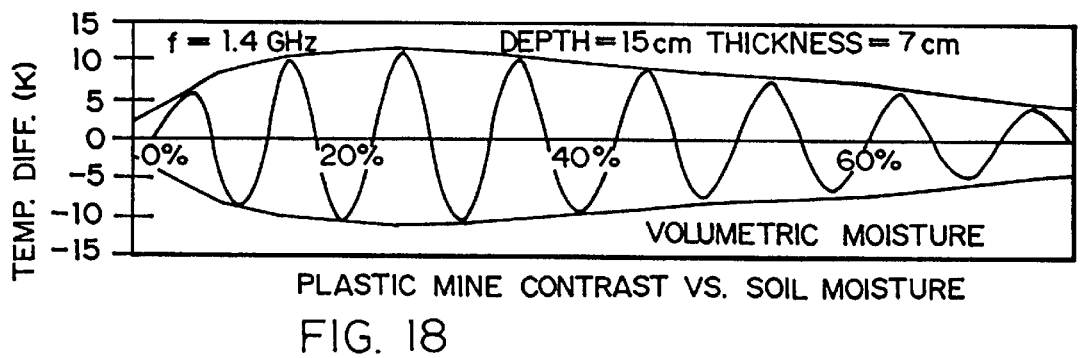

To accomplish the desired search rates of 20 m²/minute with a single-beam sensor, repetitive left-to-right and right-to-left scan motions are required while stepping forward at each scan reversal point. A sensor beam spots elliptical geometry on the ground of 3 inches (cross-track) by 15 inches (down-track) ensuring a beamfill factor above 20% for AP mines at a rate of a one second per scan (FIG. 7).

To achieve the narrowest sensor footprint geometry against AP mines at the desired projection ranges (4 feet) with a reasonably sized antenna (<2 feet), the likely frequency range will span from 2 to 10 GHz. The sensor's frequency may need to be extended to 1 GHz for reliable detection of the large buried AT mines in wet soil.

The elliptical beam shape required will be produced by shaping the lens aperture to be wider than taller and designing the antenna feed pattern accordingly.

A higher-cost option consists of two or more vertically stacked narrow beams to provide higher resolution, sensitivity and size discrimination, if needed, while covering the required 15 inch down-track swath width.

As shown, two converging visible laser beams will mark the center of the sensor pattern to the operator to aid in maintaining sensor pattern focus field at mine search depths and to accurately pinpoint mine location.

Detection confirmation (FIG. 8) will require refocusing the sensor closer to increase beamfill factor. The beamforming function may use a wide-angle feed with either a lens or reflector to allow changing sensor focal lengths simply by adjusting axial feed position and reducing sensor spot size. For example, by halving the focal length from 4 feet to 2 feet, the AP beamfill factor can be increased from 20% to 80% to achieve a high confidence detection confirmation.

Vehicle Mine Detectors

The vehicular configuration has key objectives of swath width (3 meters), sensor forward pattern projection (3 meters), high rate of advance (15 km/hr), and high Pd (near 1.0) together with an extremely low false alarm rate (0.002/m^2 on road). These requirements led to the generalized sensor configuration shown in FIG. 9. The main difference from the hand-held system is the use of two separate antennas which are:

(1) A moderate resolution fixed multi-beam configuration for search covering the full swath, and (2) A rapidly-positionable high resolution imaging configuration for confirmation and accurate location.

Most likely, these sensors will operate from 1 to 5 GHz to achieve desired detection performance against buried AT mines under wet soil conditions.

Three antenna technologies apply: Reflectors, lenses, and phased arrays. The applicable types include a cylindrical-elliptic reflector with a beamforming feed array, a cylindrical lens with a beamforming feed array (FIG. 10), and a pair of spherical Luneberg-type lenses with multiple feeds and a Multi-Element Phased Array.

With the exception of the spherical lens approach, all others will utilize a beamforming feed arrangement.

Supporting Analysis Reveal Strong Mine Signatures

Computer models of radiometric phenomena include metallic and plastic mines embedded in soil. The primary function of the models is supporting sensor and data retrieval algorithm design for space-based passive microwave remote sensing of earth's atmosphere and surface. As designed, these models are one-dimensional in structure (since typical sensor patterns from space platforms span several kilometers and many wavelengths). However, they incorporate many three-dimensional effects, such as wavelength-dependent radiance scattering in aerosols, various vegetative canopy effects and soil roughness.

For the initial analysis, the mines were modeled as infinite in planar extent, meaning that sensor beam pattern extent was smaller than the mines. The exercise of the modified models then revealed the RIS phenomenon. Furthermore, first-principles support for the RIS hypothesis came by developing a closed-form solution using a simplified assumption of homogeneous soil in thermal equilibrium with the mines. Model exercises were conducted to better understand and quantify the RIS under various conditions. Primary RIS drivers are mine type (metal or plastic), mine depth, soil type, soil moisture, soil salinity, and sensor parameters (look, angle, polarization and frequency).

It is customary to define the observed radiometric phenomena in terms of "brightness temperature", i.e., the temperature of an ideal "black body" radiator emitting the same radiance level in the sensor's waveband. Due to the linear relationship in the microwave region between absolute temperature and thermal emissions, the brightness temperature is the product of the object's thermometric temperature and its emissivity. The results of analyses are expressed in terms of contrast or brightness temperature difference between identical soil regions with and without mines.

Metallic Mine Signatures

The essential RIS contrast from metallic mines is shown in FIG. 11 for a narrow-band radiometer. At the surface, the mine has a very strong direct contrast (DC) of −190° K due to its low emissivity compared with the surrounding soil. At increased depth, strong alternating contrast (AC) cycles develop while the DC contrast average decays to near zero.

The AC is produced by coherent interference of radiance within soil layer above the mine. The differential path of coherent ray pairs lengthens with depth causing periodic interference at half-wavelength intervals. The DC decays due to increased total path radiance within the soil layer. Similar AC modulations form when depth is constant and the changing variables are either frequency (FIGS. 12 and 13), soil moisture (FIG. 14), or sensor angle. The modulation waveform's phase in FIGS. 11 to 14 will shift as the "fixed" parameters change value. The envelope outlines shown define contrast space for small changes of these other parameters.

Since the Fresnel reflection coefficients at the surface of a metallic mine and clear soil-air interface are independent of frequency, the RIS formed has just one fundamental harmonic with an oscillation period inversely proportional to mine depth and soil moisture. FIGS. 12 and 13 show the RIS vs. sensor frequency (at two depths) for a stressing soil moisture attenuation rate. Clearly, the lower frequencies show significantly stronger RIS levels.

The decrease of AC at shallow depths comes with a strong DC increase (as seen in FIG. 11). This indicates that both AC and DC are needed to ensure reliable mine detection throughout the expected depth range.

The available RIS for deep HM mines at higher soil moisture exceeds 10° K peak-to-peak. This gives an SNR margin of 100:1 for typical radiometric sensors, applicable to reducing sensor beamfill factor requirements.

Plastic Mine Signatures

The RIS formation for plastic mines is depicted in FIGS. 15 through 18. In FIG. 15, narrow-band contrast at 1.4 GHz is shown vs. depth for moist soil. An exposed mine acts as an impedance-matching quarter-wave transformer at the selected frequency causing an increase in soil radiance, and hence, a positive contrast. The temperature contrast approaches zero at the surface for those frequencies where the mine forms a half-wavelength "radome" atop the soil with no net effect on radiance. When placed below the surface, cyclical contrast vs. depth develops in a manner similar to metal mines. However, when viewing the contrast in the frequency domain (FIGS. 16 and 17) the difference from metal mines becomes readily apparent. For a plastic mine in soil, the reflection coefficient at the mine's upper surface is a function of frequency due to multiple reflections within the mine itself. This leads to two other fundamental frequencies in addition to the one resulting from multiple reflections within the ground layer located above the mine. One frequency arises from multiple reflections inside the mine and the other from reflections between the mine's bottom and the soil surface. Although radiance amplitudes of the last two fundamental frequencies are small, their presence can differentiate plastic mines from metallic ones.

The amplitude of the first fundamental frequency is proportional to the product of two factors: the Fresnel reflection coefficient at the soil-mine interface, and the propagation losses within the soil. Both factors increase as soil moisture increases. The increase in Fresnel reflection coefficient enhances power level but the increase in the propagation loss decreases it. Therefore, the maximum contrast (FIG. 18) occurs at intermediate levels of soil moisture.

Shallow Plastic Mine Considerations

Figure 19:
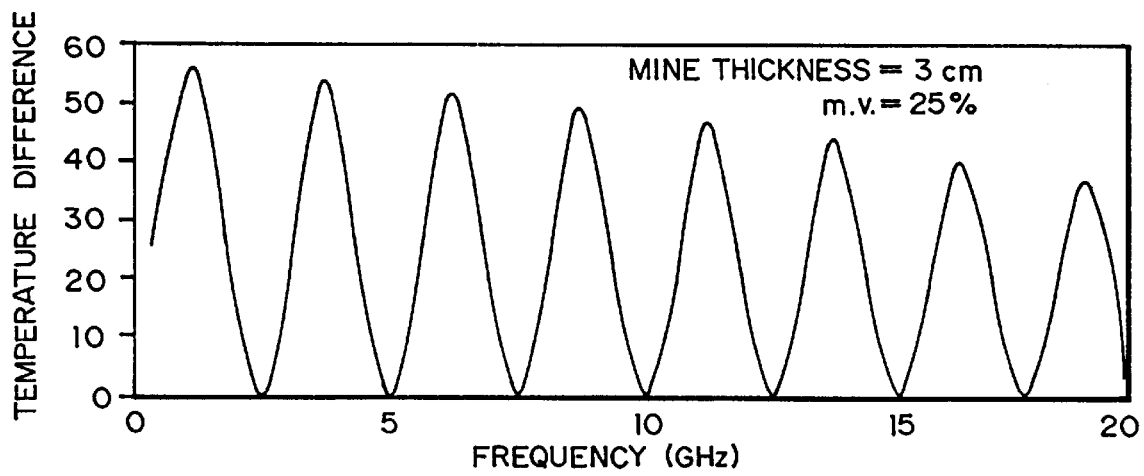
Figure 20:
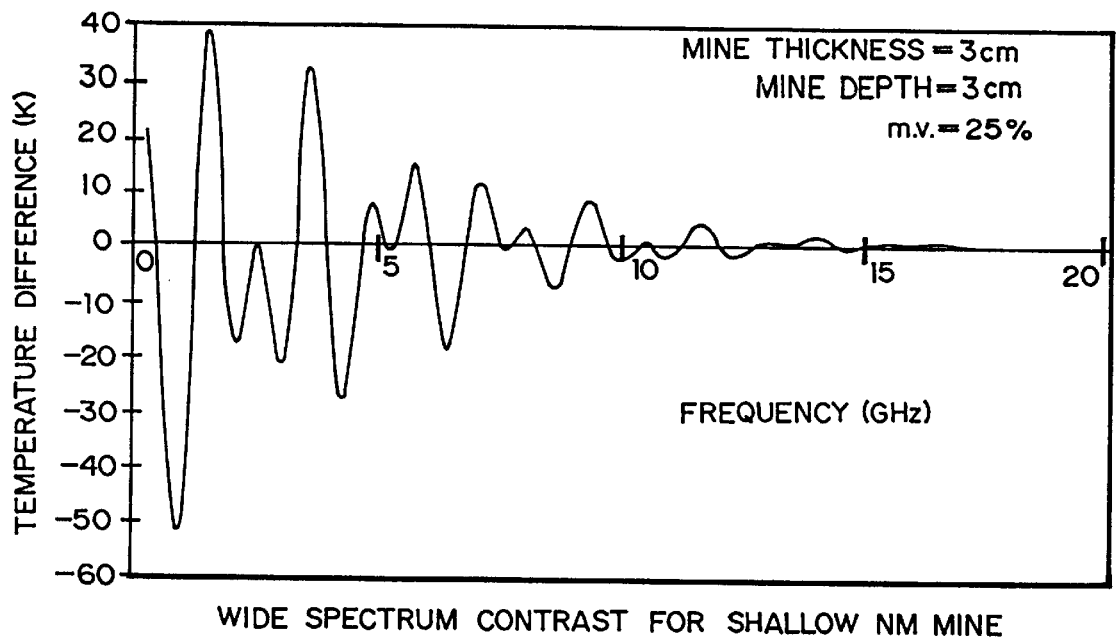

Additional analyses were performed on shallow plastic mines in moist soil to check the feasibility of using higher frequencies (near 10 GHz) with high-resolution sensor patterns at standoff ranges for AP mine detection. The results for a 3 cm thick mine are shown in FIGS. 19 and 20. The conclusions from these analyses confirm that detectable signals are present at these higher frequencies.

Figure 21:
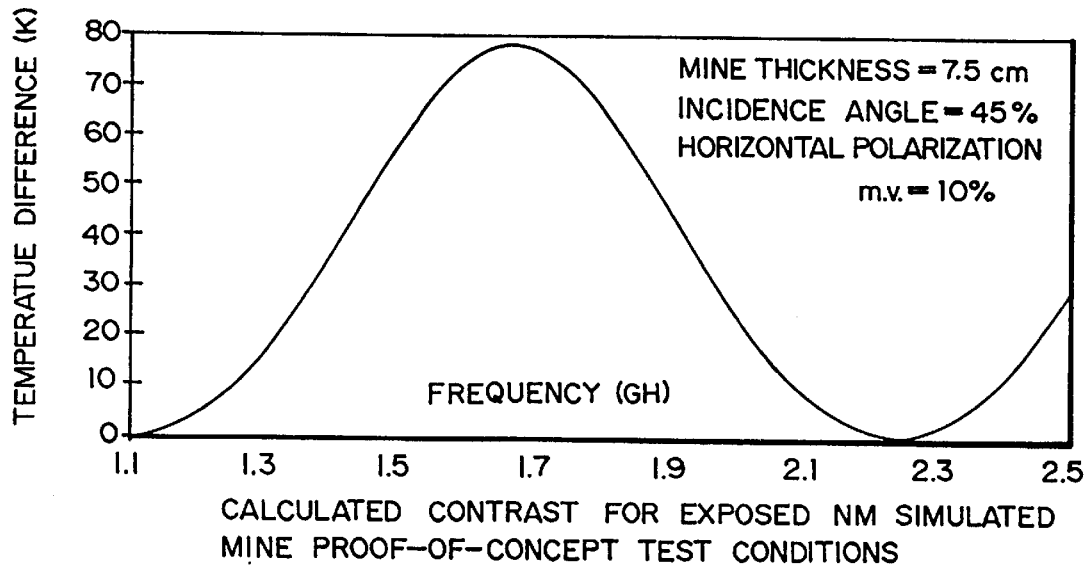

Test conditions of a surface-laid 3 inch thick plastic mine simulator were modeled and the resulting calculations are shown in FIG. 21. These post-test model outputs closely correlate with test results.

Effects of Rock Clutter

The effect of rocks on the radiometer response is controlled by the location of the rocks with respect to the upper surface of the soil. Shallow rocks or rocks located at the soil surface can be treated as irregularities. Those irregularities reduce the coherent radiation and increase the incoherent radiation. This leads to a reduction in radiometer sensitivity to the mine presence as shown in FIG. 22, where the contrast temperature is depicted as a function of radiometer frequency at two different types of irregularities (rocks).

When single isolated rocks are located in soil at typical mine depths, a false alarm potential exists. The analysis undertaken on this topic revealed that rocks act primarily as upwelling radiation scatterers, leading to a reduction of brightness temperature observed from above. Models were developed for this scattering process and statistics compiled for a uniform distribution of spherical rocks ranging in radius from 5 mm to 15 cm. These rocks were uniformly distributed from 1 cm to 30 cm in depth. The results of model exercises are shown in FIG. 23. Rock contrast signals where predominantly negative (reduced radiance) due to their scattering of upwelling radiance, with amplitude distributions like Rayleigh or log-normal type (with negative-pointed tails).

Figure 24:
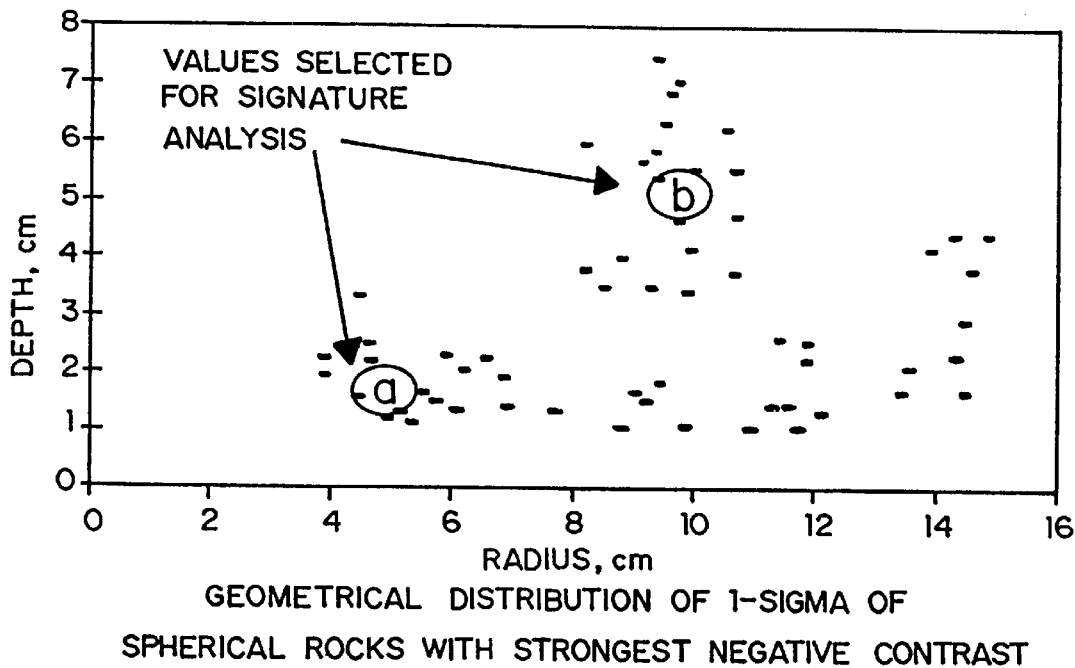

To better understand the responses of rocks which may compete with mines, a 15% subset of rocks (with the strongest signatures at 1.4 GHz) was selected by exceeding a negative threshold shown in FIG. 23. The defining data for these rocks were radii and burial depths, which are shown in FIG. 24.

Figure 25:
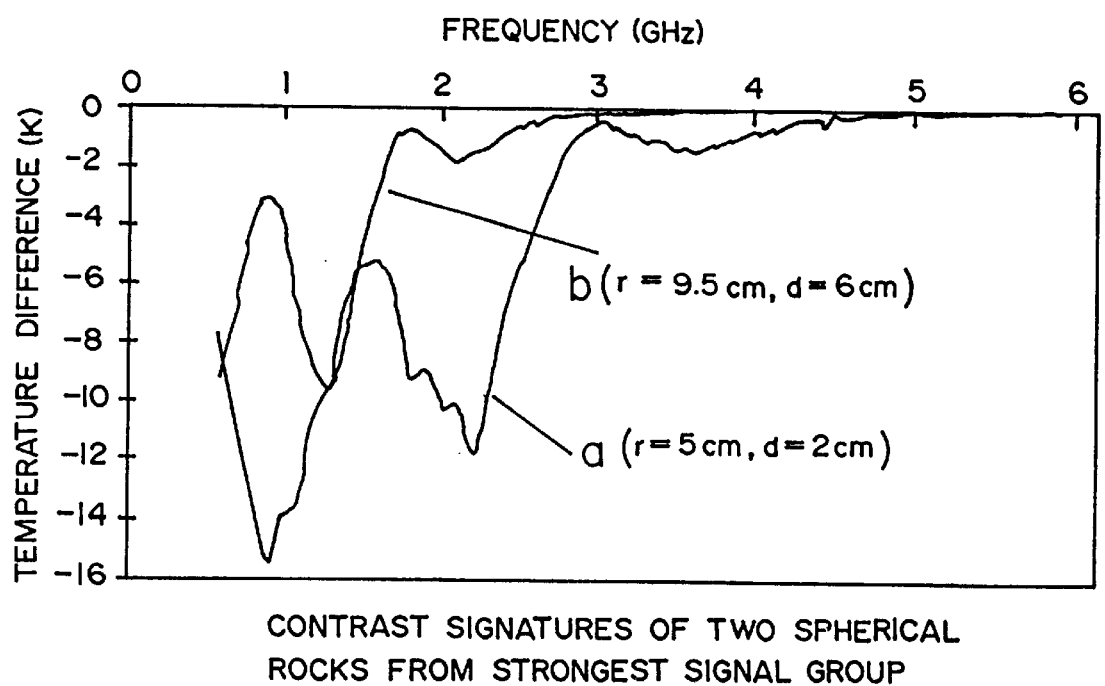

The results show clustering of responses at radius multiples of 4.5 cm, which correspond to half-wave intervals of 1.4 GHz in the rock medium. This means that the rocks have the strongest scattering responses at their resonant frequencies. For the last step in this analysis, two rocks were selected for spectral response evaluation. The results are shown in FIG. 25.

Large rocks will produce detectable spectral interference; the unipolar character of these signals is likely to be a major discriminant of rocks from buried mines, which will typically have bipolar signatures. Additionally, the flat cavity formed by the mine-soil and soil-air interfaces will alter the interference waveform predictably when the look angle is changed, while the rock's spectral response will typically stay unchanged with a changing look angle. Thus, we expect to find both recognizable basic signature differences and define confirmation procedures to further enhance the discrimination of rocks from mines.

Effect of Soil Salinity is Moderate

In the lower part of the microwave frequency band, soil salinity has a pronounced effect on soil conductivity. The presence of salt in a soil increases the soil conductivity, but its effect on soil dielectric constant relaxation frequency and the real part of soil dielectric constant are secondary.

The increase in soil conductivity moderately reduces the level of the emitted signal received by the radiometer and shifts the location of the fundamental frequencies.

Sensor Noise Effects are Benign

The key drivers on radiometric sensor sensitivity are the losses in front-end components, sensor beam efficiency, and available observation (beam dwell) time. The state of the art in microwave frequencies offers mature low-noise amplifiers at low cost with noise temperatures below 100° K. Assuming additional antenna losses of 1 dB, and observing soil at 300° K, brings the total system noise temperature to approximately 460° K.

In vehicular systems, the sensor's forward beam projection geometry will cause a downtrack pattern extent on the ground of approximately 1 meter. This provides a 0.25 seconds beam dwell time at tactical speeds of 15 km/hr. Assuming that some oversampling will be applied, a total integration time of 0.1 sec is reasonable. The spectrum is likely to be partitioned into 30 spaced samples, each about 100 MHZ wide, each dwelling about 3 milliseconds. The sensor noise equation is:

$$NE\Delta T = T_{sys}/(T*RFBW)^{1/2}$$

Where NEΔT is the noise-equivalent differential temperature, $T_{sys}$ is the system noise temperature, T is the observation time consant, and RFBW is the radiometer frequency single sample bandwidth.

The results of this analysis show that, for a single spectral sample, NEDT will be 1° K. This will be reduced to 0.1° k by further signal processing of the RIS such as the Fourier transform, which has the same effect as spectral noise filtering (via coherent integration).

Thermal and Soil Gradient Effects will Enhance Mine Signatures

The preceding analyses have assumed a soil with uniform thermometric temperature and moisture profiles. However, in nature those profiles are not uniform. When thermometric temperature variations are present, heat transfer occurs through conduction. A mine embedded in soil will alter local heat conduction paths, causing temperature gradients which could aid detection.

When soil moisture evaporates, moisture flux moves up from deeper depths to the soil upper surface through capillary action. As with the thermal gradient effects, a mine will block moisture flow, altering distribution of moisture in soil around it, further enhancing detection potential.

SUMMARY

The assessment of RIS phenomenology for mines and clutter objects is presented in TABLE II. The formulations and simulations indicate the closed-form nature of the RIS, which lends itself to powerful feature recognition algorithms.

TABLE II

PHENOMENOLOGY OF MENES AND CLUTTER

| | MINES | | CLUTTER | |
| --- | --- | --- | --- | --- |
| | HM | LM/NM | FOILAGE/ROUGHNESS | ROCKS |
| SURFACE | DC < 180° K.<br>AC = 0 | DC = 0<br>AC: Single Oscillation vs. Frequency<br>Δf α thickness$^{-1}$ | Spectral Smear | Spectral Smear |
| BURIED | DC = 0<br>AC: Single Oscillation vs. Frequency<br>Δf α d$^{-1}$ | DC = 0<br>AC: Triple Oscillation vs. Frequency<br>Δf$_1$ α d$^{-1}$, Δf$_2$ α t$^{-1}$,<br>Δf$_3$ α(d + t)$^{-1}$, | — | DC < 0<br>AC: Single Oscillation<br>Δf α s$^{-1}$ |

Spectral Modulation Period: Δf, Depth: d, Mine Thickness: t, Rock Size: s

Having thus disclosed preferred embodiments of the invention, it being understood that the scope of protection is limited only by the combinations of elements hereinafter enumerated,

What we claim as unique and unobvious is:

1. An apparatus for detecting buried mines; the apparatus comprising:
   an antenna for receiving selected frequency signals;
   at least one low-noise amplifier for amplifying said signals;
   a programmable filter for sampling the frequency spectrum of said signals;

a video detector for detecting selected frequency within said spectrum;

a video integrator and amplifier for generating a selected range of said spectrum;

an analog-to-digital converter for digitizing said selected spectrum range;

a processor for detecting a pre-selected radiometric signature within said digitized spectrum range; and a display for generating a visual representation of mine detection.

2. The apparatus recited in claim 1 further comprising a programmable frequency source and a mixer for downconverting said signals to baseband.

3. The apparatus recited in claim 1 wherein said antenna is configured for receiving signals in the frequency range of 1 GHz to 10 GHz.

4. The apparatus recited in claim 1 wherein said signals comprise natural radiance emissions from soil and interfering reflections from buried mine surfaces.

5. The apparatus recited in claim 1 further comprising means for separately processing radiometric signatures resulting from horizontal and vertical polarizations of said signals.

6. The apparatus recited in claim 1 further comprising an audible alarm activated by a signature corresponding to detection of a buried mine.

7. The apparatus recited in claim 1 wherein said antenna comprises a movable lens feed for changing focal length.

8. The apparatus recited in claim 1 wherein said antenna comprises a movable reflector feed for changing focal length.

9. The apparatus recited in claim 1 wherein said apparatus is configured for hand-held implementation.

10. The apparatus recited in claim 1 wherein said apparatus is configured for vehicle-mounted implementation.

11. An apparatus for use in searching for and detecting buried mines; the apparatus comprising:

an antenna for receiving naturally occurring radiometric emissions from soil;

a baseband converter for converting said emissions to a baseband frequency;

a spectrum analyzer for generating the frequency spectrum of said emissions;

a spectral signature analyzer for recognizing the frequency spectrum signature of a buried mine; and a mine signature recognition indicator for alerting a user of a detected mine;

wherein said antenna is configured for receiving signals in the frequency range of 1 GHz to 10 GHz.

12. The apparatus recited in claim 11 wherein said emissions comprise natural radiance emissions from soil and interfering reflections from buried mine surfaces.

13. An apparatus for use in searching for and detecting buried mines; the apparatus comprising:

an antenna for receiving naturally occurring radiometric emissions from soil;

a baseband converter for converting said emissions to a baseband frequency;

a spectrum analyzer for generating the frequency spectrum of said emissions;

a spectral signature analyzer for recognizing the frequency spectrum signature of a buried mine; and a mine signature recognition indicator for alerting a user of a detected mine;

further comprising means for separately processing radiometric signatures resulting from horizontal and vertical polarizations of said signals.

14. The apparatus recited in claim 1 further comprising an audible alarm activated by a signature corresponding to detection of a buried mine.

15. An apparatus for use in searching for and detecting buried mines; the apparatus comprising:

an antenna for receiving naturally occurring radiometric emissions from soil;

a baseband converter for converting said emissions to a baseband frequency;

a spectrum analyzer for generating the frequency spectrum of said emissions;

a spectral signature analyzer for recognizing the frequency spectrum signature of a buried mine; and a mine signature recognition indicator for alerting a user of a detected mine;

wherein said antenna comprises a movable lens feed for changing focal length.

16. An apparatus for use in searching for and detecting buried mines; the apparatus comprising:

an antenna for receiving naturally occurring radiometric emissions from soil;

a baseband converter for converting said emissions to a baseband frequency;

a spectrum analyzer for generating the frequency spectrum of said emissions;

a spectral signature analyzer for recognizing the frequency spectrum signature of a buried mine; and a mine signature recognition indicator for alerting a user of a detected mine;

wherein said antenna comprises a movable reflector feed for changing focal length.

17. The apparatus recited in claim 13 wherein said apparatus is configured for hand-held implementation.

18. The apparatus recited in claim 13 wherein said apparatus is configured for vehicle-mounted implementation.

19. The apparatus recited in claim 15 wherein said focal length change is implemented by altering axial feed position of said antenna.

20. The apparatus recited in claim 16 wherein said focal length change is implemented by altering axial feed position of said antenna.

* * * * *